United States Patent
Spock et al.

(10) Patent No.: US 7,873,111 B2
(45) Date of Patent: Jan. 18, 2011

(54) METHOD AND SYSTEM FOR SYNCHORONIZING A RECEIVER IN AN OFDM SYSTEM

(75) Inventors: Gregory P. Spock, Fort Worth, TX (US); Xiaoyong Yu, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 790 days.

(21) Appl. No.: 11/301,403

(22) Filed: Dec. 13, 2005

(65) Prior Publication Data

US 2007/0133697 A1 Jun. 14, 2007

(51) Int. Cl.
H04K 1/10 (2006.01)
(52) U.S. Cl. .................. 375/260; 375/326; 375/325; 375/354; 375/231
(58) Field of Classification Search .......... 375/260, 375/231, 326
See application file for complete search history.

(56) References Cited

U.S. PATENT DOCUMENTS

| | | | |
|---|---|---|---|
| 6,618,352 B1 | 9/2003 | Shirakata et al. | |
| 6,891,792 B1 | 5/2005 | Cimini, Jr. et al. | |
| 6,959,050 B2 * | 10/2005 | Baum et al. | 375/326 |
| 7,251,283 B2 * | 7/2007 | Chen | 375/260 |
| 2002/0176354 A1 | 11/2002 | Chiodini | |
| 2006/0239179 A1 * | 10/2006 | Berkeman et al. | 370/208 |
| 2007/0036233 A1 * | 2/2007 | Yu et al. | 375/260 |
| 2008/0219340 A1 * | 9/2008 | Saed | 375/231 |

* cited by examiner

Primary Examiner—Sudhanshu C Pathak (57) ABSTRACT

Method and system for synchronizing a receiver in an Orthogonal Frequency Division Multiplexing (OFDM) system. The method comprises transforming (105) a received signal from the time domain into the frequency domain to produce a transformed signal. The method further comprises rotating (110) each set of ranging tones of the transformed signal in the frequency domain based on a corresponding tone index to produce a set of phase-rotated frequency domain received ranging tones that is equivalent to time domain shifted ranging signals. Each ranging tone is rotated iteratively over a predefined set of delay-values and each delay-value within the predefined set of delay-values ranges from zero to a predetermined time delay. Also, the method comprises computing (115) a detection metric corresponding to each delay-value within the predefined set of delay-values based on the set of phase-rotated frequency domain received ranging tones.

24 Claims, 7 Drawing Sheets

METHOD AND SYSTEM FOR SYNCHORONIZING A RECEIVER IN AN OFDM SYSTEM

FIELD OF THE INVENTION

The invention relates generally to communication systems and more particularly to receivers and receiver functionality in orthogonal frequency division multiplexing (OFDM) communication systems.

BACKGROUND OF THE INVENTION

Existing OFDM systems require a method to detect initial transmissions by transmitters that are either not stationary or operating in cells with a large cell radius. After the initial detection, multiple transformations are applied to the received signal to estimate a timing offset. The multiple transformations in these OFDM systems co-relates a timing offset of the transformed received signal in the time domain with a tone index. This transformation and correlation in the timing domain can result in a coarse synchronization of the receiver for the received signal. The timing offset may then be periodically checked.

BRIEF DESCRIPTION OF THE FIGURES

In the accompanying figures like reference numerals refer to identical or functionally similar elements throughout the separate views. The accompanying figures, together with the detailed description below, are incorporated into and form part of the specification and serve to further illustrate various embodiments and to explain various principles and advantages, all in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to synchronizing a receiver in an Orthogonal Frequency Division Multiplexing (OFDM) system. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of an OFDM system described herein. The non-processor circuits may include, but are not limited to, a radio receiver, a radio transmitter, signal drivers, clock circuits, power source circuits, and user input devices. As such, these functions may be interpreted as steps of a method of synchronizing a receiver in an OFDM system. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention provides a method and system for synchronizing a receiver in an OFDM system. The method comprises transforming a received signal from the time domain into the frequency domain to produce a transformed signal. The method further comprises rotating each set of ranging tones of the transformed signal in the frequency domain based on a corresponding tone index to produce a set of phase-rotated frequency domain received ranging tones that is equivalent to time domain shifted ranging signals. Each ranging tone is rotated iteratively over a predefined set of delay-values and each delay-value within the predefined set of delay-values ranges from zero to a predetermined time delay. Also, the method comprises computing a detection metric corresponding to each delay-value within the predefined set of delay-values based on the set of phase-rotated frequency domain received ranging tones.

Figure 1:
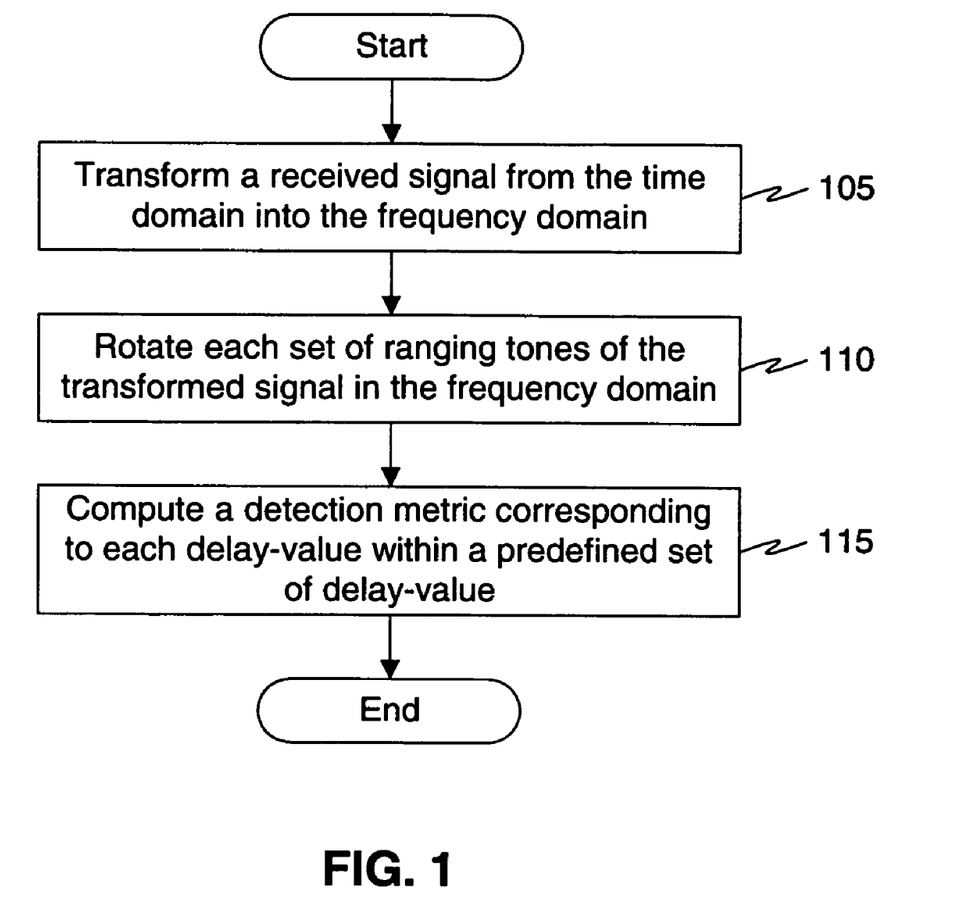
FIG. 1 is a flow diagram of a method for synchronizing a receiver in an Orthogonal Frequency Division Multiplexing (OFDM) system, in accordance with an embodiment of the invention.

FIG. 1 is a flow diagram of a method for synchronizing a receiver in an OFDM system, in accordance with an embodiment of the invention. At step 105, a received signal is transformed from the time domain into the frequency domain. In one embodiment of the invention, the received signal is a downlink signal. In another embodiment of the invention, the received signal is an uplink signal.

The received signal is transformed from the time domain to the frequency domain using the Fast Fourier Transformation (FFT). In an exemplary embodiment of the invention, the FFT of a sample 'S' set of 128 tones can be computed according to (1). (It should be noted here that, for illustrative purposes, an OFDM system with FFT size 128, CP length 16, five OFDM symbols for ranging processing and 5 access sequences, each using 16 tones with QPSK modulation, is used in the following example. Therefore, N=128, Nsym=5, CP=16 and 5 sets of 16-tones are used for this example. However, these values may vary with different OFDM systems.)

$$\tilde{s}_{(\mathit{offset},\sigma,v)} = \Im[s_{128(\mathit{offset},\sigma)(t)}] \qquad (1)$$

where, $$s_{128(\mathit{offset},\sigma)(t)} = \{s_{144(\mathit{offset},\sigma)(t+CP)} \cdots s_{144(\mathit{offset},\sigma)(t+CP+N-1)}\}$$

$$s_{144(\mathit{offset},\sigma)(t)} = \{s_{(t+(\sigma-1)(N+CP)+\mathit{offset})} \cdots s_{(t+\sigma(N+CP-1)+\mathit{offset})}\}$$

offset=0 ... (N+CP−1); sample-spaced search offsets v=1 ... N (N=128 tones);

σ=1 ... $N_{sym}$ ($N_{sym}$=5 symbols);

c=1 ... CP (CP=16 samples); and

As a result, a set of N tones $\tilde{s}_{(\mathit{offset},\sigma,v)}$ per offset, per symbol is yielded. Further, six receivers can share 128 tones and one tone group can be kept reserved. Each tone group forms a signature (i) and each receiver can utilize 16 tones (k) per signature. Therefore, the set of 128 tones are reduced and unmapped to five sets of 16 tones using the following unmapping function:

$$\tilde{s}_{(i,\mathit{offset},\sigma,k)} = \mathrm{UNMAP}(\tilde{s}_{(\mathit{offset},\sigma,v)}i) \qquad (2)$$

where, UNMAP is a function used for unmapping the 128 tones to 5 sets of 16 tones. Further, if the received samples have a substantially perfect alignment and the FFT is performed on an offset-by-offset basis, a non-coherent demodulation is carried out using equation (3):

$$nc_{met(i,\mathit{offset})} = \sum_{\sigma=1}^{5} \sum_{k=1}^{16} \tilde{s}_{(i,\mathit{offset},\sigma,k)} [x_{(i,\sigma,k)}]^* \qquad (3)$$

where $x_{(i,\sigma,k)}$ is a frequency domain access sequence (for example, it is assumed here that this sequence is a Quadrature Phase Shift Keying (QPSK) modulated symbol vector for the signature i, the symbol σ and the tone k). The output obtained from the FFT is multiplied by the conjugate of the QPSK modulated symbol vector and summed across each tone and OFDM symbols used for ranging.

At step 110, each set of ranging tones of the transformed signal is rotated in the frequency domain based on a corresponding tone index. This produces a set of phase-rotated frequency domain received ranging tones that is equivalent to time domain shifted ranging signals. In various embodiments of the invention, each ranging tone is rotated iteratively over a predefined set of delay-values. Further, each delay-value within the predefined set of delay-values ranges from zero to a predetermined time delay.

In an embodiment of the invention, a ranging tone of the transformed signal is rotated in the frequency domain by multiplying the ranging tone with a corresponding phaser. For example, the ranging signal is equivalently time shifted when a phaser is applied in the frequency domain using equation (4):

$$s(t-t_d) = \tilde{s}(f)e^{-j\omega t_d} \qquad (4)$$

The phaser corresponding to the ranging tone may depend on the frequency associated with the corresponding ranging tone index.

At step 115, a detection metric is computed based on (3) corresponding to each delay-value within the predefined set of delay-value based on the set of phase-rotated frequency domain received ranging tones.

In an embodiment of the invention, the detection metric is maximum at an offset-delay-value equal to a timing offset of the receiver. Further, one of the phase-rotated frequency domain received ranging tones may become coherent with a known frequency domain access sequence when the detection metric is maximum. In this embodiment of the invention, to compute a detection metric corresponding to each delay-value, each set of phase-rotated frequency domain received tones is correlated with a set of known frequency domain access sequence. Also, the received signal is determined to be detected when one or more detection metric is greater than a predetermined threshold. This is further explained in conjunction with FIG. 2.

Figure 2:
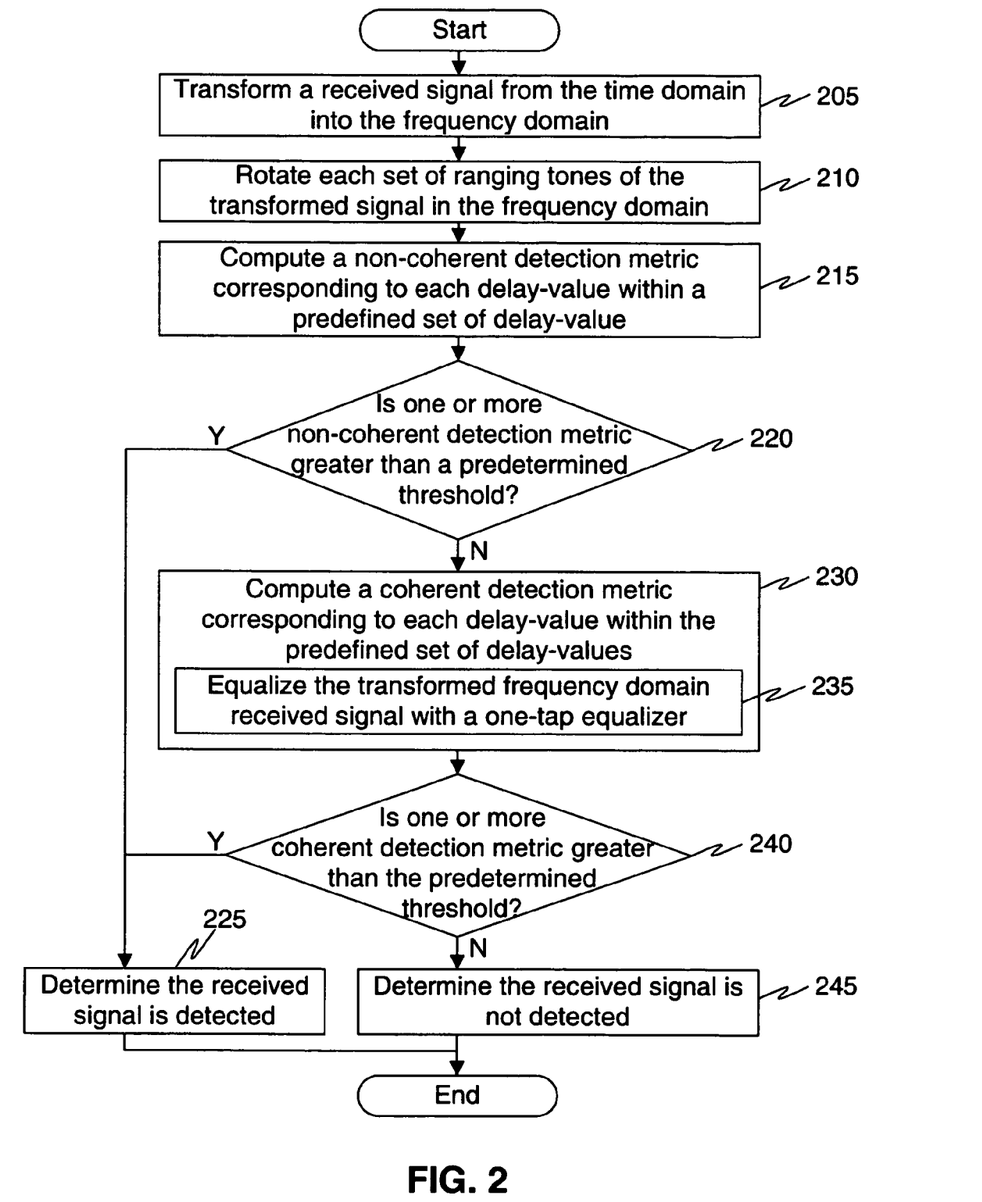
FIG. 2 is a flow diagram of a method for synchronizing a receiver in an OFDM system, in accordance with another embodiment of the invention.

FIG. 2 is a flow diagram of a method for synchronizing a receiver in an OFDM system, in accordance with an embodiment of the invention. At step 205, the received signal is transformed from time domain to frequency domain. At step 210, each set of ranging tones of the transformed signal is rotated in frequency domain.

At step 215, a non-coherent detection metric corresponding to each delay-value within a predefined set of delay-value is computed. In an exemplary embodiment of the invention, a non-coherent timing shift vector can be estimated using equation (5):

$$tsv_{(i,\tau,k)} = e^{j2\pi \frac{T_{(i,k)}}{N}\tau} \qquad (5)$$

where, $T_{(i,k)}$ is a particular tone frequency normalized from 0 to 127, N is equal to 128 tones and τ is equal to $-t_d$ normalized again to the FFT unit steps. The vectors in the timing offset are per tone and are rotated through the range of τ. A non-coherent demodulation is then carried out using equation (6):

$$nc_{met(i,\mu,z)} = \sum_{\sigma=1}^{5} \sum_{k=1}^{16} \tilde{s}_{(i,\mu,\sigma,k)} [x_{(i,\sigma,k)} tsv_{(i,\tau,k)}]^* \qquad (6)$$

where, $\mu = 1 \ldots M$; $M = 2, 3, 4$ or $9$ *FFTs* per symbol $\tau = -1 \ldots -Q$; $Q = \dfrac{N+CP}{M}$ phase steps The search "offset" can be related to $\tau$ and $\mu$ by:

$$\tau = -\text{mod}(\text{offset}, Q) - 1 \qquad (7)$$

$$\mu = \text{offset} + \tau + 2 \qquad (8)$$

The sample selection and FFT can be redefined using the terms $\tau$ and $\mu$.

$$s_{144(\mu,\sigma)(t)} = s_{(t+(\sigma-1)(N+CP)+(\mu-1)Q)} \cdots s_{(t+\sigma(N+CP-1)+\mu Q)} \qquad (9)$$

$$s_{128(\mu,\sigma)(t)} = s_{144(\mu,\sigma)(t+CP)} \cdots s_{144(\mu,\sigma)(t+CP+N-1)} \qquad (10)$$

$$\tilde{s}_{(\mu,\sigma,\nu)} = \Im[s_{128(\mu,\sigma)(t)}] \qquad (11)$$

$$\tilde{s}_{(i,\mu,\sigma,k)} = \text{UNMAP}(\tilde{s}_{(\mu,\sigma,\nu)}, i) \qquad (12)$$

The maximum detection metric is found and the values of $\mu_{max}$ and $\tau_{max}$ are recorded.

$$nc_{met}(i, \mu_{max}, \tau_{max}) = \max(|nc_{met}(i, \mu\tau)|^2) \qquad (13)$$

At step 220, it is determined whether one or more non-coherent detection metrics is greater than a predetermined threshold. If it is determined that one or more non-coherent detection metrics is greater than the predetermined threshold, the received signal is determined to be detected, at step 225. Further, the delay-value at which the non-coherent detection metric is maximum is the timing offset of the receiver.

However, if it is determined that all non-coherent detection metrics are not greater than the predetermined threshold, a coherent detection metric is computed corresponding to each delay-value within a predefined set of delay-values at step 230. At step 235, to compute a coherent detection metric, the transformed frequency domain received signal is equalized with a one-tap equalizer. In an embodiment of the invention, a one-tap equalizer coefficient corresponding to a ranging tone is equal to the inverse of a channel estimate associated with the corresponding ranging tone.

In an exemplary embodiment of the invention, the coherent detection metric is computed by computing a set of vectors for a coherent correction. The set of vectors for the coherent correction are computed by combining the frequency-offset and a phaser, as given by equation (14):

$$cv_{coh(i,\tau,k)} e^{-(\theta mid(i,k)+(\sigma-3)\Delta\theta_{(i)})} \qquad (14)$$

The post FFT tones are re-demodulated and the coherent correction vectors are applied to the FFT tones. The real components of the vectors of the coherent correction are summed to produce a coherent detection metric. The demodulation calculation is carried out as follows:

$$coh_{met(i,\mu,\tau)} = \sum_{\sigma=1}^{5} \sum_{k=1}^{16} \text{Re}(\tilde{s}_{(i,\mu,k,\sigma)}[x_{(i,\sigma,k)}tsv_{(i,\tau,k)}]^* cv_{coh(i,\sigma,k)}) \qquad (15)$$

In an embodiment of the invention, the offsets that are represented by $\mu_{max}$ and $\tau_{max}$, +/−2 offsets have to be re-demodulated. This reduces the MIPS (Million Instructions Per Second) during the second pass.

The maximum metric is found and the values of $\mu_{max}$ and $\tau_{max}$ recorded.

$$coh_{met(i,\mu_{max},\tau_{max})} = \max(coh_{met(i,\mu,\tau)}) \qquad (16)$$

At step 240, it is determined whether one or more coherent detection metrics is greater than the predetermined threshold. If it is determined that one or more coherent detection metrics is greater than the predetermined threshold, the received signal is determined to be detected, at step 225. Further, the delay-value at which the coherent detection metric is maximum is the timing offset of the receiver. However, if it is determined that none of the coherent detection metrics is greater than the predetermined threshold, the received signal is determined to be not detected, at step 245.

Figure 3:
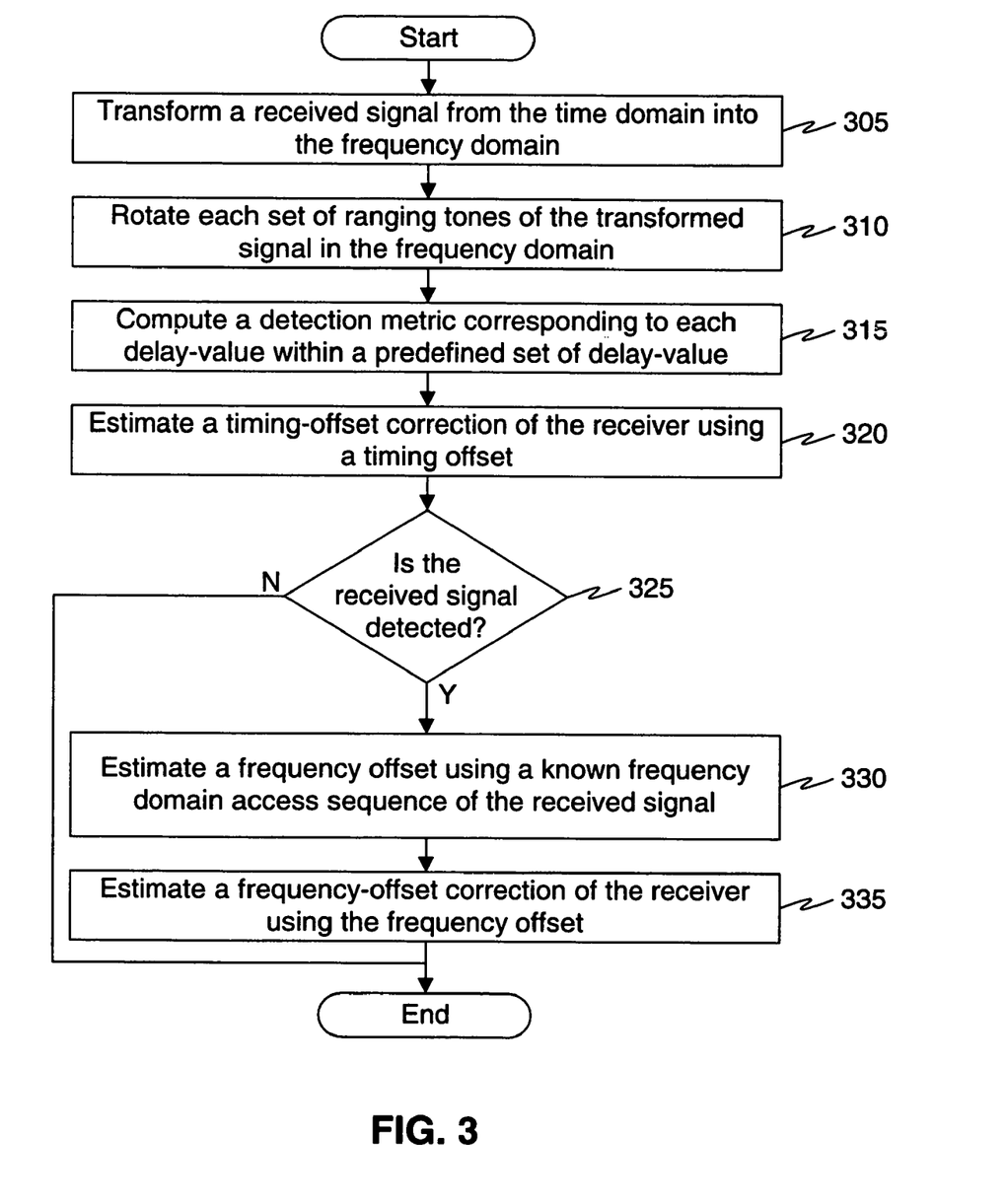
FIG. 3 is a flow diagram of a method for synchronizing a receiver in an OFDM system, in accordance with yet another embodiment of the invention.

FIG. 3 is a flow diagram of a method for synchronizing a receiver in an OFDM system, in accordance with an embodiment of the invention. At step 305, the received signal is transformed from time domain to frequency domain. At step 310, each set of ranging tones of the transformed signal is rotated in frequency domain. At step 315, a detection metric is computed corresponding to each delay-value within the predefined set of delay-values based on the set of phase-rotated frequency domain received ranging tones. Further, the detection metric is maximum at an offset-delay-value equal to a timing offset of the receiver. Also, one of the phase-rotated frequency domain received ranging tones may become coherent with a known frequency domain access sequence when the detection metric is maximum.

At step 320, a timing-offset correction of the receiver is estimated using the timing offset. This is further explained in conjunction with FIG. 4. At step 325, it is determined whether the received signal is detected. If it is determined that the received signal is detected, the frequency offset is estimated using the known frequency domain access sequence of the received signal, as step 330. This is further explained in conjunction with FIG. 5. At step 335, the frequency-offset correction of the receiver is estimated using the frequency offset. This is further explained in conjunction with FIG. 6.

Figure 4:
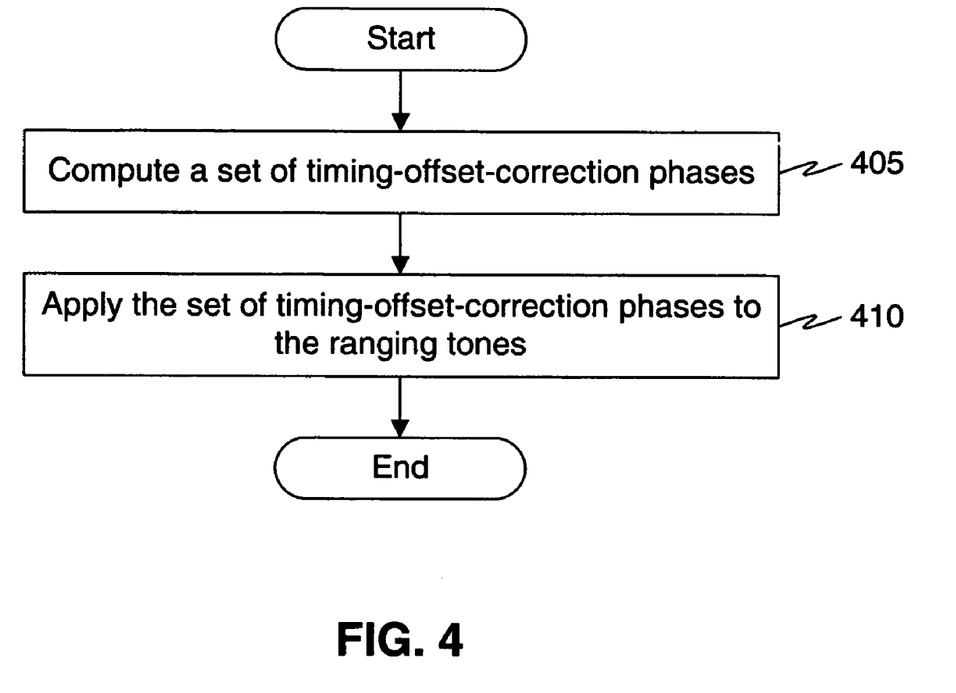
FIG. 4 is a flow diagram of a method for estimating timing-offset correction, in accordance with another embodiment of the invention.

FIG. 4 is a flow diagram of a method for estimating timing-offset correction, in accordance with an embodiment of the invention. At step 405, a set of timing-offset correction phases is computed. The timing offset is computed as follows:

$$CE_{(i,\sigma,k)} = \tilde{s}_{(i,\mu_{max},\sigma,k)}[x_{(i,\sigma,k)}tsv_{(i,\tau_{max},k)}]^* \qquad (17)$$

Summing all the vectors for the timing offset over the symbol, the average timing offset per ranging tone is computed. The average timing offset per ranging tone is computed as follows:

$$CE_{avg(i,k)} = \sum_{\sigma=1}^{5} CE_{(i,\sigma,k)} \qquad (18)$$

As a result, the timing-offset correction phase can be computed as follows:

$$\theta_{mid(i,k)} = \tan^{-1}\left(\frac{\text{Im}(CE_{avg(i,k)})}{\text{Re}(CE_{avg(i,k)})}\right) \qquad (19)$$

At step 410, the set of timing-offset correction phases is applied to the ranging tones to estimate the timing-offset correction.

Figure 5:
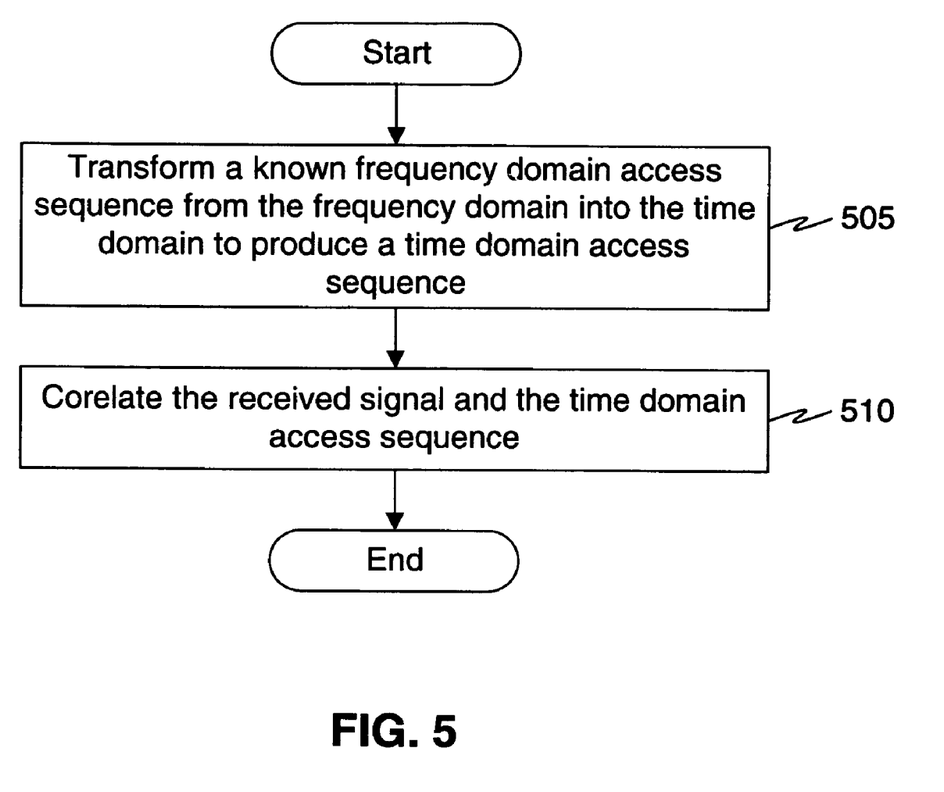
FIG. 5 is a flow diagram of a method for estimating frequency offset, in accordance with an embodiment of the invention.

FIG. 5 is a flow diagram of a method for estimating frequency offset, in accordance with an embodiment of the invention. At step 505, the known frequency access sequence is transformed from the frequency domain into the time domain to produce a time domain access sequence. At step 510, the received signal is correlated with the time domain access sequence to get the frequency offset of the receiver.

Figure 6:
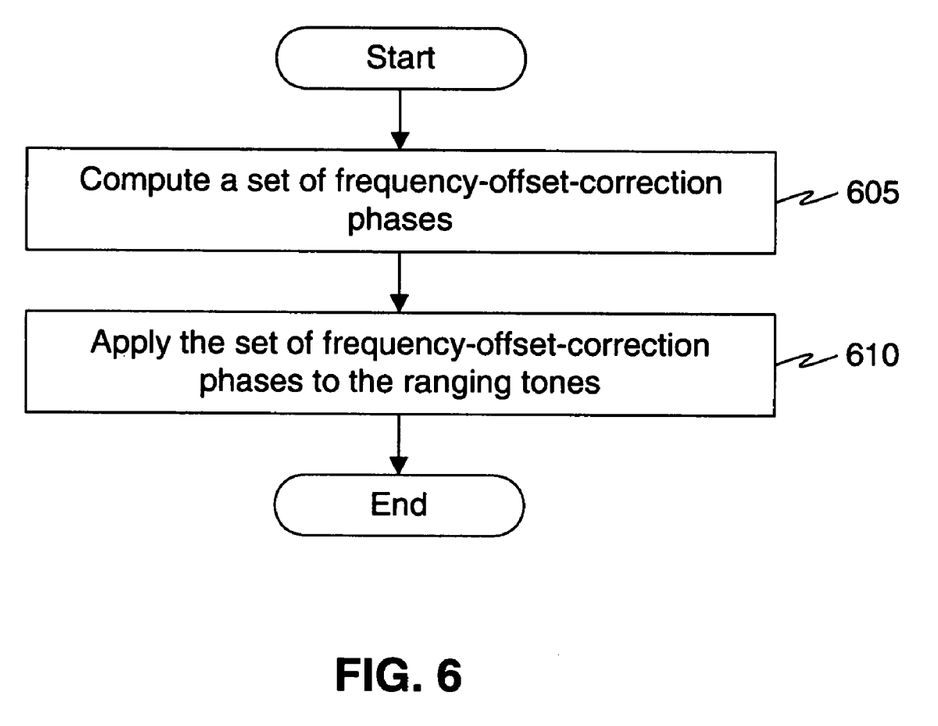
FIG. 6 is a flow diagram of a method for estimating frequency-offset correction, in accordance with an embodiment of the invention.

FIG. 6 is a flow diagram of a method for the frequency-offset correction, in accordance with an embodiment of the invention. At step 605, a set of frequency-offset correction phases is computed. The phase deviation between the adjacent symbols of the ranging tone is computed to estimate the frequency-offset correction phases. The computed phase deviations are then summed across each symbol and ranging tone. The frequency-offset per unit time is computed as follows:

$$\frac{\Delta\phi_{(i)}}{\Delta T_{sym}} = \sum_{k=1}^{16}\sum_{\sigma=2}^{5} CE_{(i,\sigma,k)}[CE_{(i,\sigma-1,k)}]^* \qquad (25)$$

The frequency-offset correction phase is computed as follows:

$$\frac{\Delta\theta_{(i)}}{\Delta T_{sym}} = \tan^{-1}\left(\frac{\mathrm{Im}\left(\frac{\Delta\phi_{(i)}}{\Delta T_{sym}}\right)}{\mathrm{Re}\left(\frac{\Delta\phi_{(i)}}{\Delta T_{sym}}\right)}\right) \qquad (26)$$

At step 610, the set of frequency-offset correction phases is applied to the ranging tones to get the frequency-offset correction.

Figure 7:
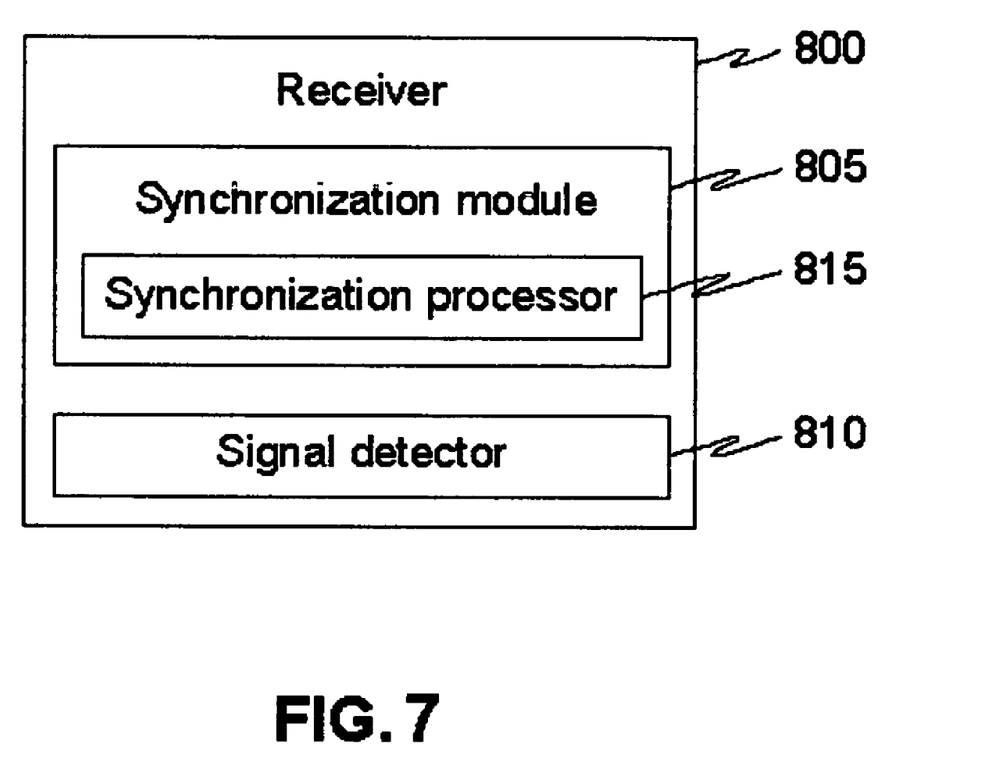
FIG. 7 is a block diagram of a receiver, in accordance with an embodiment of the invention.

FIG. 7 is a block diagram of a receiver 800, in accordance with an embodiment of the invention. The receiver 800 comprises a synchronization module 805 and a signal detector 810. The synchronization module 805 comprises a synchronization processor 815.

The synchronization processor 815 is configured to transform the received signal from the time domain to the frequency domain and rotate each set of the ranging tones of the transformed signal in the frequency domain based on the corresponding ranging tone index. The set of phase-rotated frequency domain received ranging tones that is equivalent to the time domain shifted ranging signal is produced after rotating each set of ranging tones of the transformed signal in the frequency domain.

The synchronization processor 815 rotates each ranging tone iteratively over the predefined set of delay-values and each delay-value ranges from zero to the predetermined time-delay. Further, the synchronization processor 815 computes the detection metric corresponding to each delay-value within the predefined set of delay-values based on the set of phased rotated frequency domain received ranging tones. The computed detection metric is associated with the time domain shifted received ranging signal. The synchronization processor 815 estimates the frequency offset of the receiver 800 using the known frequency domain access sequence of the received signal if the received signal is detected.

The synchronization processor 815 computes the detection metric, which is maximum at the offset-delay-value equal to the timing offset of the receiver. The detection metric at the offset-delay-value is indicative of the power of the received signal. The synchronization processor 815 is configured to estimate timing-offset correction of the receiver using the timing offset. The synchronization processor 815 computes a set of timing-offset correction phases to estimate the timing-offset correction and apply the set of timing-offset correction phases to the ranging tones.

The synchronization processor 815 is further configured to estimate the frequency offset. The frequency offset is computed by transforming the known frequency domain access sequence from the frequency domain into the time domain to produce the time domain access sequence and correlating the received signal and the time domain access sequence. The synchronization processor 815 is further configured to estimate the frequency-offset correction of the receiver 800 using the frequency offset. The synchronization processor 815 estimates the frequency-offset correction by computing the set of frequency-offset correction phases and applying the set of frequency-offset correction phases to the ranging tones.

The synchronization processor 815 is further configured to compute the non-coherent detection metric, wherein the signal detector 810 determines that the received signal is detected if at least one non-coherent detection metric is greater than the predetermined threshold. The non-coherent detection metric is computed in the receiver 800 by the synchronization processor 815 after the received signal is detected by the signal detector 810 and if at least one non-coherent detection metric is greater than a predetermined threshold. The synchronization processor 815 is also configured to compute the coherent detection metric corresponding to each delay-value within the predefined set of delay-values based on the corresponding set of phase-rotated frequency domain received ranging tones. The coherent detection metric is computed if each non-coherent detection metric is less than the predetermined threshold and the ascertaining module determines that the received signal is detected if at least one coherent detection metric is greater than the predetermined threshold. The coherent detection metric is computed by the synchronization processor 815 by equalizing the transformed frequency domain received signal with the one-tap equalizer and the coefficients corresponding to each ranging tone.

The various embodiments of the invention provide a method and system that allows the synchronization of the receiver with a single FFT. The FFT transforms the received signal into the frequency domain. The ranging tones are rotated in a recursive fashion according to tone index. As a result, multiple transformations are eliminated for computing the timing-offset correction and applying the computed timing-offset correction to the receiver.

The various embodiments of the invention can provide a highly accurate initial open-loop timing estimate; symbol and baud synchronization can occur more quickly in some embodiments, a benefit in fading or high doppler environments. Embodiments of the invention also provide a robust method for initial detection. The detection can exhibit a low probability of false alarm and/or a high probability of detection.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for synchronizing a receiver in an Orthogonal Frequency Division Multiplexing (OFDM) system, the method comprising: transforming, by the receiver, a received signal from the time domain into the frequency domain to produce a transformed signal; rotating, by the receiver, each set of ranging tones of the transformed signal in the frequency domain based on a corresponding tone index to produce a set of phase-rotated frequency domain received ranging tones that is equivalent to time domain shifted ranging signals, each ranging tone in the sets of ranging tones being rotated iteratively over a predefined set of delay-values, wherein each delay-value within the predefined set of delay-values ranges from zero to a predetermined time delay; computing, by the receiver, a detection metric corresponding to each delay-value within the predefined set of delay-values based on the set of phase-rotated frequency domain received ranging tones; and based on the detection metrics determined for the delay values, determining a timing offset of the receiver; wherein computing a detection metric comprises computing a non-coherent detection metric and, when the non-coherent detection metric is greater than a predetermined threshold, the received signal is detected and the timing offset is determined, based on the non-coherent detection metric; and further wherein computing a detection metric comprises computing a coherent detection metric corresponding to each delay-value within the predefined set of delay-values based on the corresponding set of phase-rotated frequency domain received ranging tones if each non-coherent detection metric is less than the predetermined threshold, and when a coherent detection metric is greater than a predetermined threshold, the received signal is detected and the timing offset is determined, based on the coherent detection metric.

2. The method of claim 1, wherein the detection metric is maximum at an offset-delay-value equal to the timing offset of the receiver.

3. The method of claim 2, further comprising estimating, by the receiver, timing-offset correction of the receiver using the timing offset, wherein the step of estimating the timing-offset correction comprises:
computing a set of timing-offset-correction phases; and
applying the set of timing-offset-correction phases to the ranging tones.

4. The method of claim 1, wherein a ranging tone of the transformed signal is rotated in the frequency domain by multiplying the ranging tone with a corresponding phaser.

5. The method of claim 4, wherein a phaser corresponding to a ranging tone depends on the frequency associated with the corresponding ranging tone index.

6. The method of claim 1, wherein one set of the phase-rotated frequency domain received ranging tones becomes coherent with a known frequency domain access sequence when the detection metric is maximum.

7. The method of claim 1, further comprising:
correlating each set of the phase-rotated frequency domain received ranging tones with a set of known frequency domain access sequences; and
based on the correlations, selecting a frequency domain access sequence employed by the received signal from among the set of known frequency domain access sequences.

8. The method of claim 1, wherein the received signal is an uplink signal.

9. The method of claim 1, wherein the received signal is a downlink signal.

10. The method of claim 1, further comprising
determining, by the receiver, that the received signal is detected, if at least one detection metric is greater than a predetermined threshold.

11. The method of claim 10, further comprising:
estimating, by the receiver, a frequency offset of the receiver using a known frequency domain access sequence of the received signal if the received signal is detected, wherein one set of the phase-rotated frequency domain received ranging tones becomes coherent with the known frequency domain access sequence when the detection metric is maximum.

12. The method of claim 11, wherein the step of estimating the frequency offset comprises:
transforming the known frequency domain access sequence from the frequency domain into the time domain to produce a time domain access sequence; and
correlating the received signal and the time domain access sequence.

13. The method of claim 11, further comprising estimating, by the receiver, frequency-offset correction of the receiver using the frequency offset, wherein the step of estimating the frequency-offset correction comprises:
computing a set of frequency-offset-correction phases; and
applying the set of frequency-offset-correction phases to the ranging tones.

14. The method of claim 10, wherein the step of computing a coherent detection comprises:
equalizing transformed frequency domain received signal with a one-tap equalizer whose coefficients correspond to each ranging tone.

15. The method of claim 14, wherein a one-tap equalizer coefficient corresponding to a ranging tone is equal to the inverse of a channel estimate associated with the corresponding ranging tone.

16. A receiver comprising: a synchronization module, the synchronization module synchronizing the receiver in an Orthogonal Frequency Division Multiplexing (OFDM) system, the synchronization module comprising a synchronization processor, the synchronization processor being configured to: transform a received signal from the time domain into the frequency domain to produce a transformed signal; rotate each set of ranging tones of the transformed signal in the frequency domain based on corresponding ranging tone index to produce a set of phase-rotated frequency domain received ranging tones that is equivalent to time domain shifted ranging signal, each ranging tone in the sets of ranging tones being rotated iteratively over a predefined set of delay-values, wherein each delay-value within the predefined set of delay-values ranges from zero to a predetermined time delay; and compute a detection metric corresponding to each delay-value within the predefined set of delay-values based on the set of phased rotated frequency domain received ranging tones that is equivalent to time domain shifted received ranging signal, wherein the detection metric is maximum at an offset-delay-value, wherein the offset-delay-value is equal to a timing offset of the receiver; and determine a timing offset of the receiver based on the detection metrics determined for the delay values; wherein computing a detection metric comprises computing a non-coherent detection metric and wherein, when the non-coherent detection metric is greater than a predetermined threshold, the signal detector determines that the received signal is detected and the synchronization processor is configured to determine the timing offset based on the non-coherent detection metric; and further wherein computing a detection metric comprises computing a coherent detection metric corresponding to each delay-value within the predefined set of delay-values based on the corresponding set of phase-rotated frequency domain received ranging tones if each non-coherent detection metric is less than the predetermined threshold; and wherein, when a coherent detection metric is greater than a predetermined threshold, the signal detector determines that the received signal is detected and the synchronization processor is configured to determine the timing offset based on the coherent detection metric.

17. The receiver of claim 16, wherein the detection metric is maximum at an offset-delay-value equal to the timing offset of the receiver.

18. The receiver of claim 17, wherein the synchronization processor is configured to estimate timing-offset correction of the receiver using the timing offset, wherein the synchronization processor to estimate the timing-offset-correction is configured to:
   compute a set of timing-offset-correction phases; and
   apply the set of timing-offset-correction phases to the ranging tones.

19. The receiver of claim 16, further comprising:
   a signal detector for determining that the received signal is detected, if at least one detection metric is greater than a predetermined threshold.

20. The receiver of claim 19, wherein the synchronization processor is further configured to:
   estimate a frequency offset of the receiver using a known frequency domain access sequence of the received signal if the received signal is detected, wherein one set of the phase-rotated frequency domain received ranging tones becomes coherent with the known frequency domain access sequence when the detection metric is maximum.

21. The receiver of claim 20, wherein the synchronization processor to estimate the frequency offset is configured to:
   transform the known frequency domain access sequence from the frequency domain into the time domain to produce a time domain access sequence; and
   correlate the received signal and the time domain access sequence.

22. The receiver of claim 20, wherein the synchronization processor is further configured to estimate frequency-offset correction of the receiver using the frequency offset, wherein the synchronization processor to estimate frequency-offset correction of the receiver is configured to:
   computing a set of frequency-offset-correction phases; and
   applying the set of frequency-offset-correction phases to the ranging tones.

23. The receiver of claim 19, wherein to compute the coherent detection metric, the synchronization processor is configured to:
   equalize the transformed frequency domain received signal with a one-tap equalizer whose coefficients correspond to each ranging tone.

24. The receiver of claim 16, the synchronization processor being configured to:
   correlate each set of the phase-rotated frequency domain received ranging tones with a set of known frequency domain access sequences; and
   based on the correlations, select a frequency domain access sequence employed by the received signal from among the set of known frequency domain access sequences.

* * * * *